Patented Aug. 27, 1929.

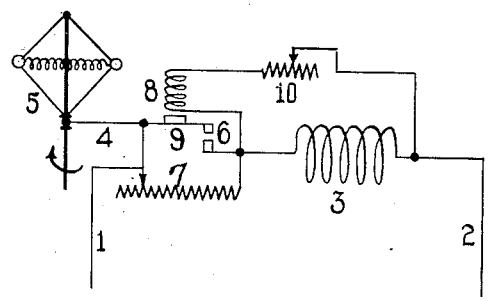
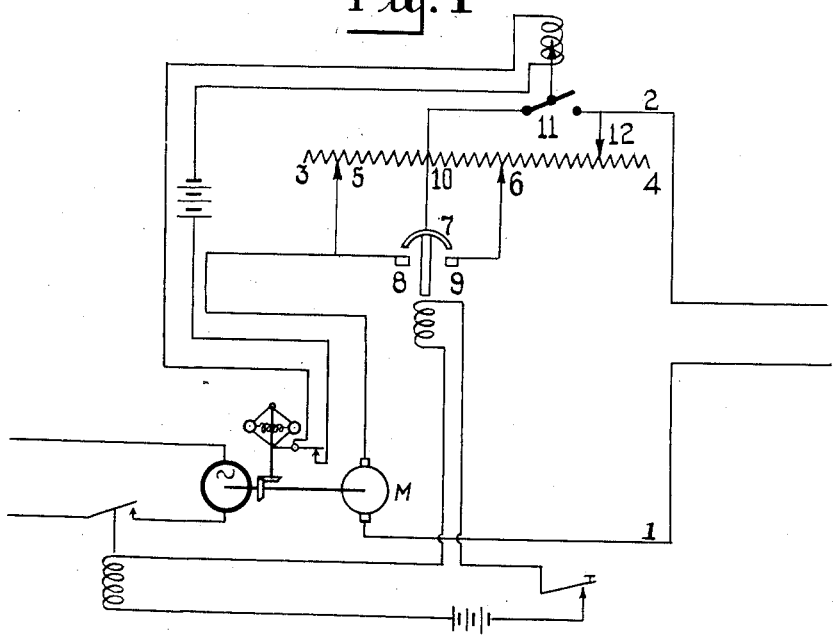

1,725,953

UNITED STATES PATENT OFFICE.

JOSEPH BETHENOD, OF PARIS, FRANCE.

CENTRIFUGAL REGULATOR FOR ELECTRIC MOTORS.

Application filed June 2, 1923, Serial No. 642,947, and in France July 25, 1922.

In certain cases, for instance for driving high frequency alternators, it is necessary to provide the electric driving motors with regulators so as to insure a sufficiently constant speed. For this purpose it has been suggested to use centrifugal force regulators called "isochrones", which are regulators adjusted almost to the limit of stability. As is well known such a regulator actuates an interrupter, which in accordance with the desired rhythm, short circuits resistances or as is more common, impedances inserted in the circuits of the motors to be regulated. In this manner almost perfect means speed constants may be obtained but the use of such arrangement will cause speed variation or "pumpings" of long periods above and below said speed. The present invention has for its object the avoidance of all possibility of such "pumpings" without sacrificing in the least the exactitude or sensitiveness of the regulator.

In accordance with main features of the present invention the following arrangements are provided:

1.—The work of the centrifugal force regulator which is adjusted to the limit of stability is diminished by compensating the effect of the variations in the load as exactly as possible.

2.—Said regulator is combined with arrangements provided for limiting the amplitudes of the individual oscillations of the complete rotating system (comprising the regulator), increasing if necessary, their frequency without however, diminishing the precision regulation.

For the purpose of limiting the effect of variations of the load, it has already been suggested to use means for automatically modifying the running of the electrical motor in proportion to said variations.

If for instance, a direct current motor is used which drives a high frequency alternator then by operating a switch which may be actuated by a signaling key to load said alternator with the signal current, an ohmic resistance, inserted in the armature circuit may be simultaneously short circuited during the time it is running under load. In this manner, the effect of the variation of load on the alternator upon its speed is compensated for by variation of the motor circuit, which variations are made as far as possible equivalent. It is obvious that the load upon the motor supply circuit varies, during manipulation of the switch in the alternator circuit, between that amount which is required to supply the no load losses, and that amount required to supply the load, load losses, and no load losses. It is, therefore, readily possible to adjust the ohmic resistance in the driving motor armature circuit to such value that when it is included in the circuit it reduces the motor current by an amount which is very closely that required to compensate for the reduction of energy delivered to the alternator, caused by removal of its load. Under these conditions the operation of the regulator is of course facilitated, because only slight irregularities of various origins must be corrected (comprising imperfections in the compensation of the load variations).

In accordance with the present invention this drawback is remedied by automatically modifying, in proportion to the load, the value of the resistance which is short circuited during the actuation of the regulator to close its contacts.

My invention is shown in the attached drawings, in which

Fig. 1 shows one form of a regulator in accordance with my invention, and

Fig. 2 shows apparatus embodying another principle of my invention.

In Fig. 1, a rheostat 3, 4 (having distinct elements of an arbitrary number) is provided between the conductors 1 and 2 forming part of the armature circuit of the motor. By means of an adjustable contact 5 and the connection 10 the value of the resistance 5, 10 may be varied and may be inserted during the idle running (or during the silent periods between signals). The motor speed responsive regulator operates through the agency of well known mechanism the interrupter 11 which is connected between the terminal 10 and an adjustable contact 12. In this manner when the free running speed tends to increase beyond the permissible upper limit, the opening of 11 will cause the introduction of a supplementary resistance 10, 12, thereby preventing any increase in speed. The resistance so inserted may be varied by actuating the adjustable contact 12.

The application of a sudden load (as by actuating the transmitting key in the above-described manner) causes contact maker 7 to make contact with terminals 8—9 thereby short-circuiting portion 5—6. At the instant the load is applied, the motor tending to slow down, the motor speed-responsive means causes interrupter 11 to short-circuit resistance 10—12, thereby removing all resistance from the armature circuit. The motor supply circuit will be through 2, 11, 10, 7, 8, M to 1. As a result the motor will increase in speed until the speed-responsive means causes 11 to open, inserting resistance 6—12 and thereby reducing the motor speed to normal. The motor supply circuit will then be through 2, 12, 6, 9, 7, 8, M to 1. During the loaded running, therefore, the speed will vary between very narrow limits, namely, with no resistance in the motor supply circuit, and resistance 6—12 in the supply circuit. The problem is thus solved in the simplest possible manner.

In accordance with a second principle also characteristic of the present invention, said regulator is combined with limiting arrangements for suitably limiting the individual oscillations of the whole rotating system. An "isochronous" regulator, that is to say, regulated without regard to, or at least to the limit of, stability is of course more sensitive and it would seem on first blush that it would permit practically only negligible speed variations between idle and loaded running. As a matter of fact, however, due to mechanical or electrical inertia of various origins, there is quite an appreciable retardation between the instant when the regulator causes a displacement in the desired direction and the instant when the corresponding effect is felt in the electrical motor couple. This digression may be such that a system of continuous oscillations is produced the period of which is usually relatively long and this will happen even in case the load is constant. As a result of such oscillations the speed will vary. In accordance with the present invention this serious drawback is remedied by adding to the centrifugal force regulator an electromagnetic device, which is actuated in response to the displacement of an arm of this regulator and which tends constantly to return said arm to its preceding position. In this manner the possibility that continuous oscillations of long period be produced is avoided because the arrangement permits the regulator to move only between very narrow limits.

An embodiment of such arrangement is shown in Fig. 2. In this figure conductors 1 and 2 are used for separately feeding armature windings 3 of a direct current motor. As well known the index 4 of the centrifugal regulator 5 actuated by the shaft of said motor operates an interrupter 6 connected with the terminals of a variable rheostat 7. The whole arrangement in series with the winding 3 will cause a continuous oscillation in the tension on the terminals of said winding which oscillation permits the maintaining of the mean speed of the motor armature between two limits very close to each other.

In accordance with what has been said above, the variations in the speed are prevented by means of an electromagnet 8 having an armature 9 carried by the arm 4 whereby this electromagnet operates in a sense opposite to an increase in the speed, its winding being connected with the terminals of 3 preferably through the agency of a variable rheostat 10, whereby the time constant of this circuit may be adjusted. It will be seen that the action of the magnet on the armature 9 is increased when the circuit is closed at 6, whereby the amplitude of the movements of arm 4 is limited. If necessary the frequency of these movements may be increased without affecting the sensitiveness of the regulator. It should be noted that a large number of modifications are possible. First of all any type of electromagnet may be used and if necessary a whole electromagnetic system may be employed.

In any case, the object of the invention to be attained is to limit the displacement of the arm of a centrifugal force regulator which is adjusted as near as possible to said indifferent condition, the means employed consisting of electromagnetic means controlled by the displacement of said arm and affecting in turn said arm. It will be seen therefore that no matter by what means the regulator actuates the motor couple and no matter what the nature of the circuit used for the regulation, the present arrangement will function correctly.

Finally it should be noted that the improvements illustrated in Figs. 1 and 2 may be used separately and the arrangement shown in Fig. 1 may be applied to a case in which other than centrifugal force regulators are used, such as for instance, purely electrical regulators.

Having described my invention, what I claim is:

1. In an electric motor speed regulator, a motor, an impedance connected in the supply circuit of said motor, speed responsive means actuated by said motor, means controlled by said speed responsive means for varying the value of said impedance and means actuated upon application of a load adapted to simultaneously but independently vary the value of said impedance both said means acting in the same sense.

2. In an electric motor speed regulator, an impedance connected in the motor circuit, motor-speed responsive means for short-circuiting a portion of said impedance, and means actuated upon application of a load for short-circuiting another portion of said impedance both said means acting in the same sense.

3. In an electric motor speed regulator, an impedance connected in the motor circuit, speed responsive means for rendering ineffective a portion of said impedance and means actuated upon application of a load for rendering ineffective another portion of said impedance plus a portion common to said first-mentioned portion, both said means acting in the same sense.

4. Means for maintaining the speed of an electric motor substantially constant under fluctuating loads, comprising an impedance connected in the supply circuit of said motor, means actuated upon application of a load arranged to short-circuit a portion of said impedance for effecting a coarse preliminary regulation, and motor speed-responsive means for effecting and completing a final fine adjustment, both said means acting in the same sense.

5. Means for regulating the speed of motors subject to fluctuating loads, comprising an impedance in the motor circuit, and means actuated upon application of a load acting to short-circuit a portion of said impedance when the load is initially applied, a centrifugal-force governor and means actuated thereby for alternately inserting and removing another portion of said impedance as the speed increases and decreases above and below the desired speed.

6. In a motor-generator set subject to sudden fluctuating loads, an impedance connected in the supply circuit of said motor, motor speed-responsive means associated with a portion of said impedance for limiting the speed of the motor when running idle, means actuated upon application of a load associated with another portion of said impedance and cooperating with said speed-responsive means for maintaining the motor at substantially constant speed while running under load, said speed-responsive means and load-actuated means acting in the same sense.

7. In a motor-generator set subject to sudden fluctuating loads, an impedance connected in the motor circuit, a centrifugal governor associated with the motor-generator set, a relay actuated by said governor to short-circuit a portion of the total impedance when the motor speed tends to decrease and to insert said portion when the motor speed tends to increase, and a second relay actuated by the application of a load on the generator for short-circuiting a second portion of the total impedance, said portion including a part of the first-mentioned portion, so that during the loaded running the motor speed will fluctuate between the very narrow limits obtained when the motor circuit has no impedance included therein and when the motor circuit has included therein an impedance equal to the difference between the first-mentioned portion and the portion common to said first and second portions.

8. A device for maintaining substantially constant the speed of a motor during its idle and loaded running, comprising an impedance in the motor circuit, a centrifugal governor actuated by the motor to short-circuit or insert a portion of the total impedance when the speed of the motor tends to decrease or increase, respectively, during both idle or loaded running, and means actuated by the application of a load for short-circuiting a second portion of the impedance, said means and the governor cooperating to short-circuit the total impedance when the load is first applied, the governor thereafter regulating the speed by removing or inserting said first-mentioned portion of the impedance when the motor speed tends to decrease and increase, respectively.

JOSEPH BETHENOD.